US009915369B2

(12) United States Patent
Kromer

(10) Patent No.: US 9,915,369 B2
(45) Date of Patent: Mar. 13, 2018

(54) SOLENOID VALVE HAVING IMPROVED OPENING AND CLOSING BEHAVIOR

(71) Applicant: Robert Bosch GmbH, Stuttgart (DE)

(72) Inventor: Ralf Kromer, Vaihingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/785,198

(22) PCT Filed: Feb. 18, 2014

(86) PCT No.: PCT/EP2014/053083
§ 371 (c)(1),
(2) Date: Oct. 16, 2015

(87) PCT Pub. No.: WO2014/170048
PCT Pub. Date: Oct. 23, 2014

(65) Prior Publication Data
US 2016/0069467 A1 Mar. 10, 2016

(30) Foreign Application Priority Data

Apr. 17, 2013 (DE) .................. 10 2013 206 959

(51) Int. Cl.
F16K 31/06 (2006.01)
F02M 51/06 (2006.01)
F02M 61/18 (2006.01)
(52) U.S. Cl.
CPC ..... F16K 31/0675 (2013.01); F02M 51/0664 (2013.01); F02M 51/0671 (2013.01);
(Continued)

(58) Field of Classification Search
CPC ........ H01F 7/16; H01F 7/1607; H01F 7/1615; H01F 7/17; H01F 2007/1676;
(Continued)

(56) References Cited

U.S. PATENT DOCUMENTS 4,403,765 A * 9/1983 Fisher .................. F16K 31/082
137/625.65
4,954,799 A * 9/1990 Kumar ..................... H01F 7/13
251/129.08

(Continued)

FOREIGN PATENT DOCUMENTS

DE 44 42 190 5/1996
DE 198 08 067 9/1999
(Continued)

OTHER PUBLICATIONS

International Search Report for PCT/EP2014/053083, dated May 13, 2014.

Primary Examiner — Matthew W Jellett
(74) Attorney, Agent, or Firm — Norton Rose Fulbright US LLP; Gerard Messina

(57) ABSTRACT

A solenoid valve for controlling fluids includes: a closing element, which opens and closes at least one outlet opening on a valve seat; a magnetic circuit having an armature, an internal pole and a magnetic return path; and a coil. The armature is connected to the closing element. The magnetic circuit includes (i) a nonmagnetic separating element for interrupting the magnetic circuit and (ii) a magnetic choke device closing the magnetic circuit on the nonmagnetic separating element, which magnetic choke device is a separate individual component which is fixed using a form-locking and/or a force-locking connection.

7 Claims, 4 Drawing Sheets

(52) U.S. Cl.
CPC ....... *F02M 61/188* (2013.01); *F02M 2200/08* (2013.01); *F02M 2200/8061* (2013.01); *F02M 2200/9069* (2013.01)

(58) Field of Classification Search
CPC .. F16K 31/06; F16K 31/0675; F16K 31/0665; F02M 2200/08; F02M 2200/8061
USPC ...................................... 251/129.15; 335/236
See application file for complete search history.

(56) References Cited

U.S. PATENT DOCUMENTS

| | | | | |
|---|---|---|---|---|
| 5,464,191 | A * | 11/1995 | Shenk ................... | B64D 11/02 251/129.15 |
| 6,029,703 | A * | 2/2000 | Erickson ............ | F15B 13/0442 137/625.61 |
| 6,601,822 | B2 * | 8/2003 | Tachibana ........... | F16K 31/0613 137/625.69 |
| 6,707,174 | B2 * | 3/2004 | Lin ..................... | F16K 31/0655 123/520 |
| 7,168,681 | B2 * | 1/2007 | Yamashita ........... | F02M 51/005 251/129.21 |
| 7,942,381 | B2 * | 5/2011 | Sugiyama ........... | F02M 51/0685 239/585.1 |
| 8,585,014 | B2 * | 11/2013 | Oikawa ............... | F16K 11/0716 251/129.15 |
| 8,632,050 | B2 * | 1/2014 | Stoeckel ............. | F16K 31/0634 251/129.15 |
| 8,985,550 | B2 * | 3/2015 | Miura .................... | F16K 31/06 251/129.15 |
| 2008/0308758 | A1 * | 12/2008 | Fukano ............... | F16K 31/0658 251/129.15 |

FOREIGN PATENT DOCUMENTS

| | | | |
|---|---|---|---|
| EP | 2 320 066 | 5/2011 | |
| JP | S60256550 A | 12/1985 | |
| JP | 2005207412 A | 8/2005 | |
| JP | 2005 307750 | 11/2005 | |
| WO | WO 2009/054848 | 4/2009 | |
| WO | WO 2012002220 A1 * | 1/2012 | ......... F16K 31/0655 |

* cited by examiner

SOLENOID VALVE HAVING IMPROVED OPENING AND CLOSING BEHAVIOR

BACKGROUND OF THE INVENTION

1. Field of the Invention

The present invention relates to a solenoid valve for controlling fluids, particularly fuel, having improved opening behavior and also improved closing behavior, at the same time.

2. Description of the Related Art

Solenoid valves are known as injection valves, for example, from the related art, in different embodiments. It has turned out that magnetic injection valves, which, in the area of the armature in the housing, have a magnetic separation, i.e. a nonmagnetic region, are able to open faster under the same conditions than valves without such a separation of the magnetic circuit. However, because of the separation of the magnetic circuit, the closing times deteriorated. In this connection, a magnetic choke has been proposed, which is inserted into the area of the magnetic separation in such a way that the magnetic choke and the magnetic separation are formed as a one-piece component. This component is produced using a two-component MIM process. Such a production process requires much effort and is relatively costly, however, so that it would be desirable to find a simpler and improved solution to this problem.

BRIEF SUMMARY OF THE INVENTION

By contrast, the solenoid valve according to the present invention, for controlling fluids, has the advantage that both the opening times and the closing times of the solenoid valve are able to be improved, and the solenoid valve may be produced particularly simply and cost-effectively in this context. This particularly enables its use in mass production. According to the present invention, this is achieved in that the solenoid valve has a magnetic circuit having an armature, an internal pole and a magnetic return path. In this context, the magnetic circuit includes a nonmagnetic separating element for interrupting the magnetic circuit, and a magnetic choke device which closes the magnetic circuit at the nonmagnetic separating element. The magnetic choke device thus has the effect of a magnetic bypass which is situated on the nonmagnetic separating element. In this context, the magnetic choke device is provided as a separate individual component, which is fixed using a form-locking and/or a force-locking connection. Thereby, the magnetic choke device is able to be provided as a cost-effectively producible individual component, and the mounting of the magnetic choke device may take place simply and rapidly. The magnetic choke device may be fixed, for example, using a clamping connection, so that the magnetic choke device is able to be mounted and also easily dismounted simply and rapidly by clamping.

The magnetic choke device is preferably situated radially outside the nonmagnetic separating element. Thereby, the magnetic choke device may be simply clamped onto the nonmagnetic separating element, for example.

In a further preferred manner, the magnetic choke device is a magnetic sleeve. A magnetic choke device in the form of a sleeve may also be mounted very simply and rapidly in that, for instance, the magnetic sleeve is pushed onto the nonmagnetic separating element and in this instance a form-locking and/or a force-locking connection is produced. The sleeve is cylindrical, particularly preferred, or alternatively the sleeve is polygonal in cross section.

According to another preferred alternative of the present invention, the magnetic choke device is preferably a strip-shaped element made of a magnetic material or the choke device includes a plurality of strip-shaped elements made of magnetic material.

Particularly preferred, the strip-shaped element has a first reshaping at a first end, which is in contact with the magnetic return path and/or the strip-shaped element has a second reshaping at a second end, which is in contact with the internal pole. The strip-shaped element, particularly preferably, has the shape of a sheet-metal strip of magnetic material.

For as rapid as possible a closing time, there is further preferred a cross sectional area of the nonmagnetic separating element that is greater than a cross sectional area of the magnetic choke device.

The nonmagnetic separating element lies particularly preferably directly on an outer surface of the magnetic choke device.

The solenoid valve according to the present invention is used especially preferably as a fuel injection valve for direct injection in internal combustion engines.

DETAILED DESCRIPTION OF THE INVENTION

Figure 1:
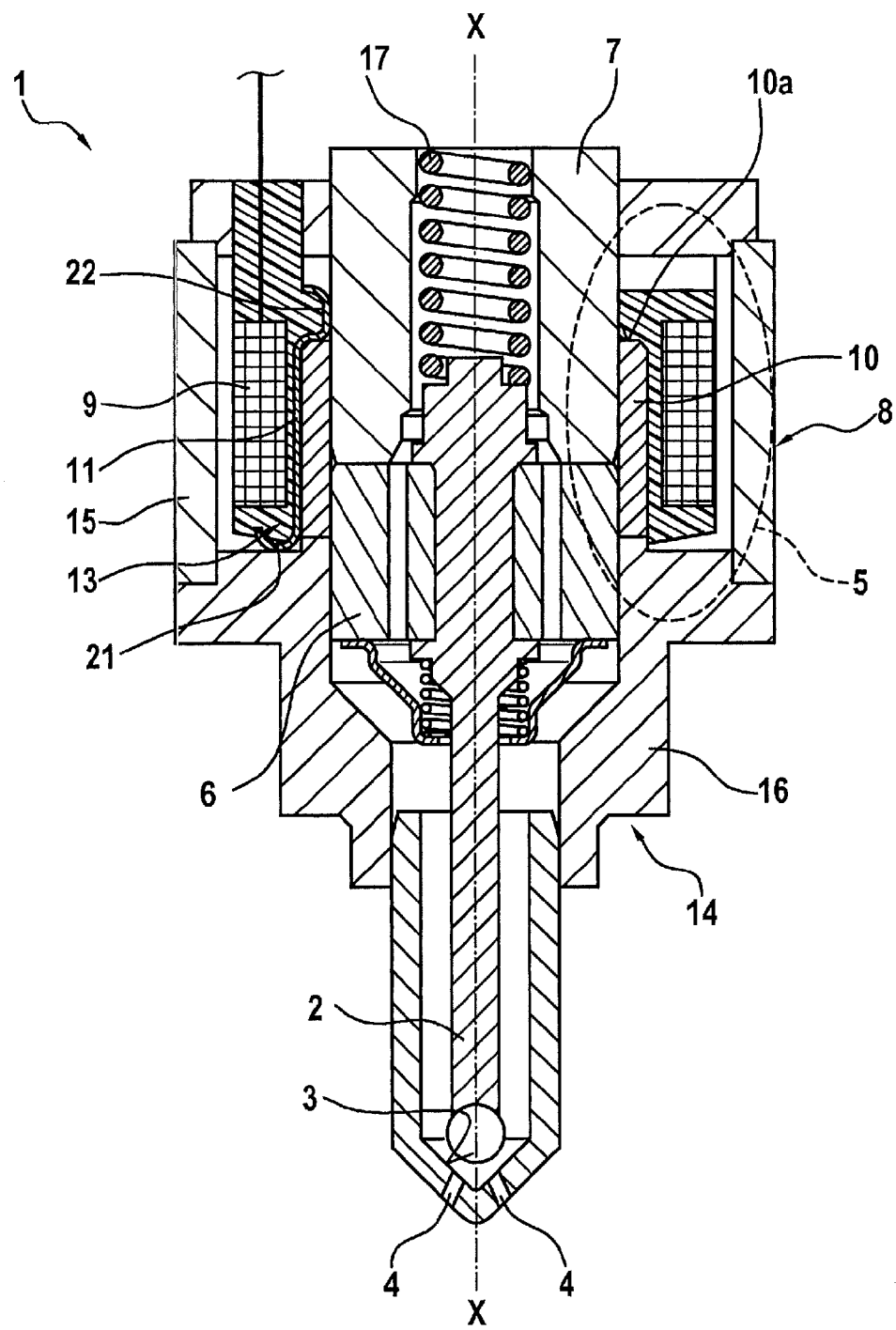
FIG. 1 shows a schematic sectional view of a solenoid valve according to a first exemplary embodiment of the present invention.

In the drawings, the same or functionally the same parts in each case denote the same parts.

A solenoid valve 1 for the controlling of a fluid is described in detail below with reference to FIGS. 1 and 2.

As may be seen in FIG. 1, solenoid valve 1 includes a closing element 2 in the form of a valve needle, which releases and closes outlet openings 4 at a valve seat 3.

Solenoid valve 1 also includes a magnetic circuit 5 having an armature 6, an internal pole 7 and a magnetic return path 8. In this exemplary embodiment, the magnetic return path 8 is a part of an housing 14 of the solenoid valve, the housing 14 being developed of a plurality of parts. In this instance, housing parts 15, 16 are parts of magnetic circuit 5.

Solenoid valve 1 further includes a coil 9, which attracts armature 6 when current is applied to it. After the supplying of current to coil 9 is terminated, a restoring element 17 sets armature 6 back to its initial position. In this instance, FIG. 1 shows the open state of solenoid valve 1, in which armature 6 lies against internal pole 7. In a known manner, armature 6 is connected to closing element 2, in order to effect the lifting motion of the closing element.

Magnetic circuit 5 of solenoid valve 1 further includes a nonmagnetic separating element 10, which is a sleeve in this exemplary embodiment. Nonmagnetic separating element 10 ensures that, upon operation of the coil, the magnetic circuit is closed rapidly via armature 6, so that a very rapid opening time is achieved. Nonmagnetic separating element 10 is, however, problematic with respect to the closing times of solenoid valve 1, which increase because of the nonmagnetic separating element 10.

This is why, according to the present invention, a choke device 13 is provided which produces a connection between housing 14, or to put it more accurately, housing part 16 and internal pole 7.

Figure 2:
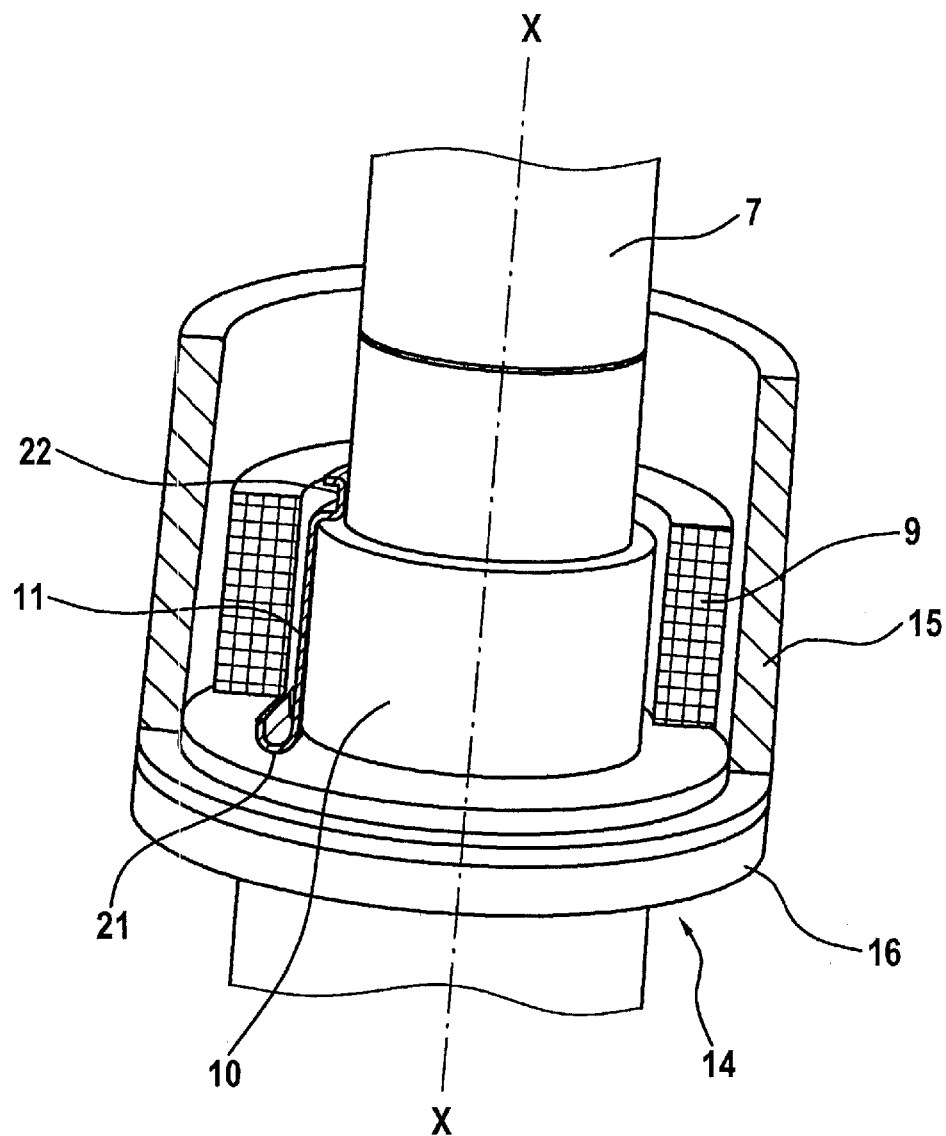
FIG. 2 shows a schematic, perspective partial view of the solenoid valve of FIG. 1.

As may be seen in FIGS. 1 and 2, magnetic choke device 13, in this exemplary embodiment, includes a plurality of strip-shaped elements 11 and nonmagnetic separating element 10 is a cylindrical sleeve. In this exemplary embodiment, three equal strip-shaped elements 11 are provided, which are equally distributed along the circumference.

Strip-shaped elements 11 at their first end have a first reshaping 21, and at their second end a second reshaping 22. The two reshapings are developed approximately U-shaped in cross section. In this context, first reshaping 21 is in contact with housing 14 and second reshaping 22 is in contact with internal pole 7. Furthermore, strip-shaped elements 11 lie directly on an outer surface of nonmagnetic separating element 10 (cf. FIG. 1).

Thus, by providing the strip-shaped magnetic choke device 13, a magnetic bridging of nonmagnetic separating element 10 is achieved. This has the effect that the closing times of the solenoid valve significantly improve, without the rapid opening times of the solenoid valve becoming worse. A cross section of nonmagnetic separating element 10, in this context, is many times greater than the cross section of magnetic choke device 13. Thereby, according to the present invention, magnetic choke device 13 is able to be produced very simply and cost-effectively. For example, strip-shaped elements 11 may be stamped from a sheet metal material of a magnetic substance.

Furthermore, magnetic choke device 13 is connected only by form-locking and/or force-locking connections to the magnetic return path or internal pole 7. In the exemplary embodiment shown in FIG. 1, strip-shaped element 11 is clamped in between housing part 16 and an end face 10a of the magnetic separating element. Because of the U-shaped design of second reshaping 22 of strip-shaped elements 11, contact is produced between strip-shaped element 11 and internal pole 7 on its outer lateral surface. Thereby, according to the present invention, magnetic choke device 13 is able to be fixed rapidly and cost-effectively by clamping.

Because of the embodiment of strip-shaped element 11 having a first and a second reshaping 21, 22 at the ends, support of strip-shaped elements 11 may be achieved in such a way that strip-shaped element 11 is supported in a springy manner on housing part 16 in the axial direction X-X and on second reshaping 22 on internal pole 7 in the radial direction.

Figure 3:
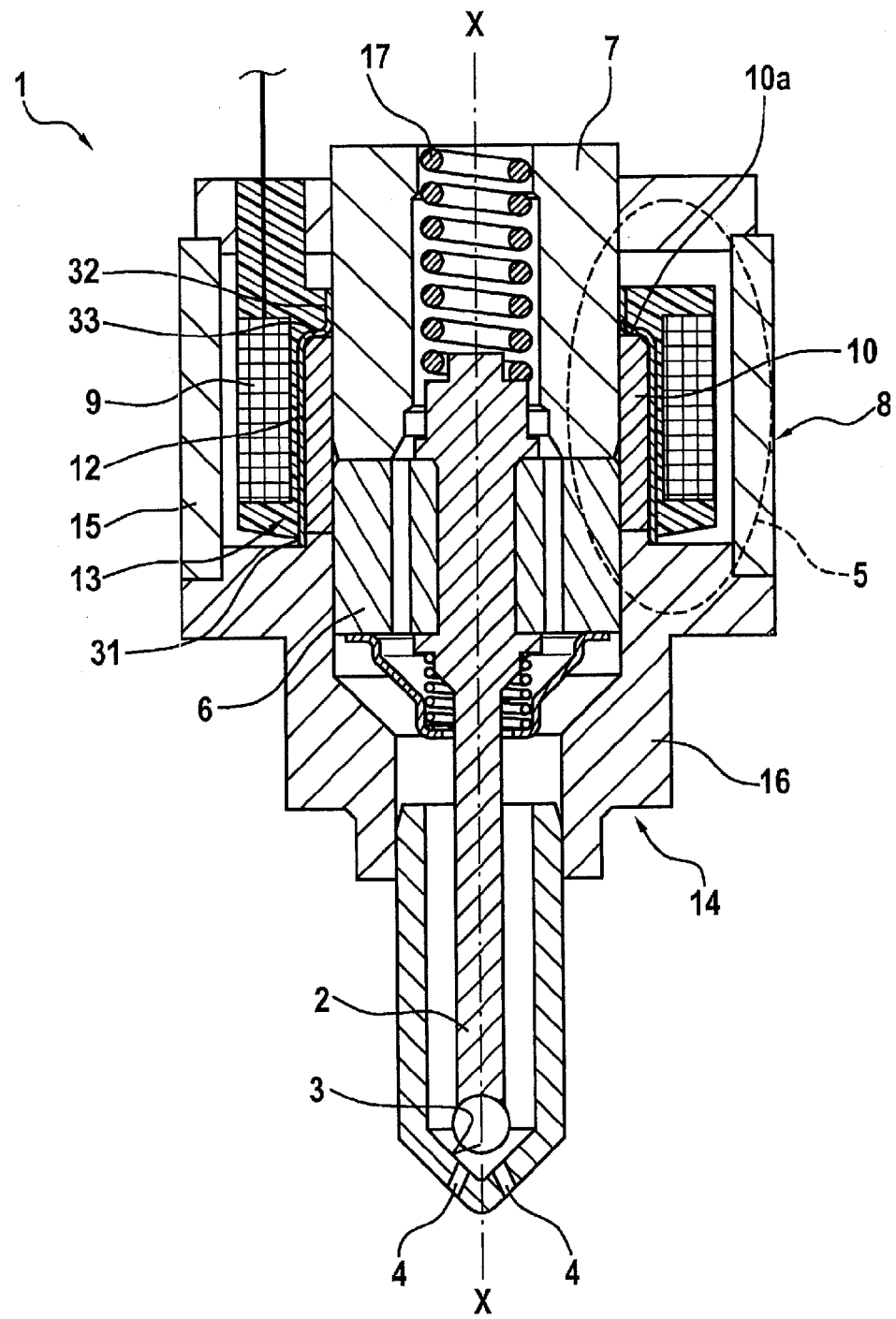
FIG. 3 shows a schematic sectional view of a solenoid valve according to a second exemplary embodiment of the present invention.
Figure 4:
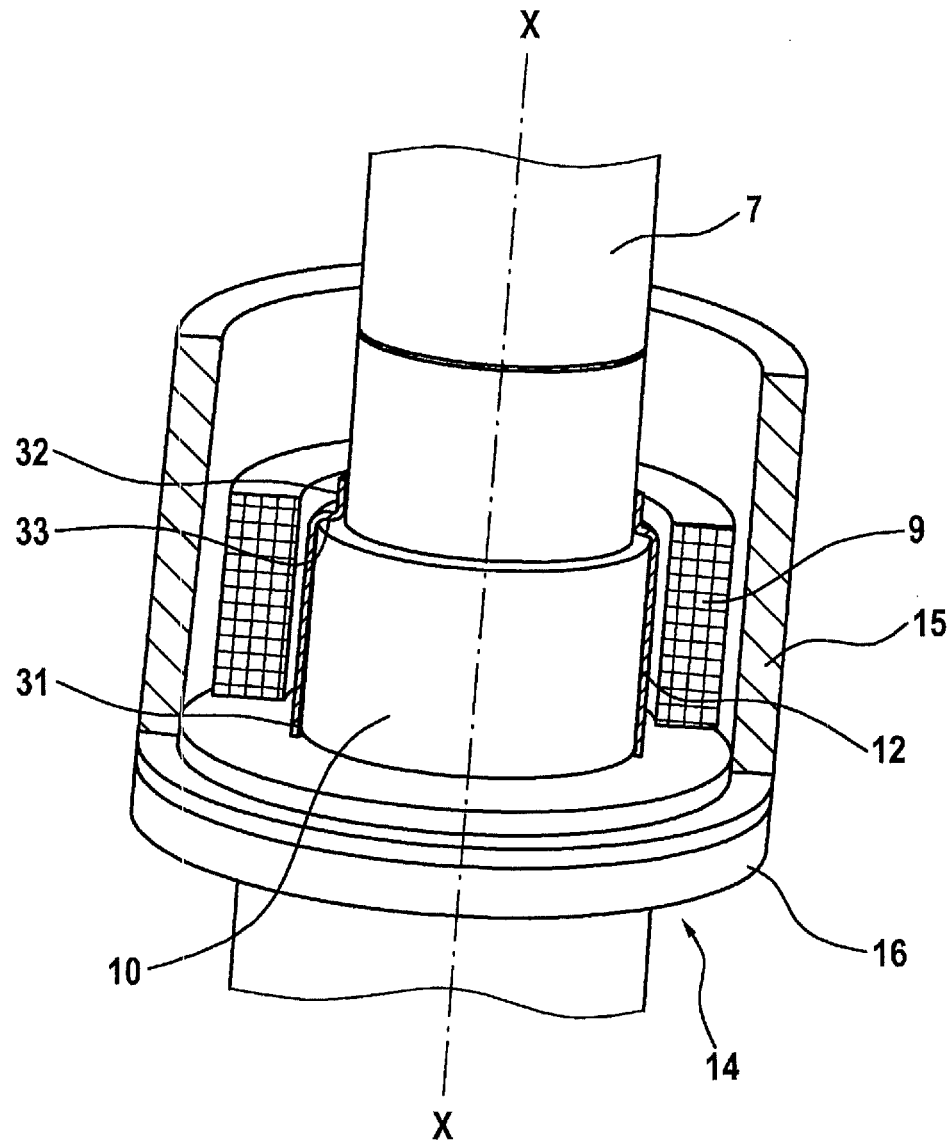
FIG. 4 shows a schematic, perspective partial view of the solenoid valve of FIG. 3.

FIGS. 3 and 4 show a solenoid valve 1 according to a second exemplary embodiment of the present invention. As may be seen particularly in FIG. 4, magnetic choke device 13 of the second exemplary embodiment is a sleeve 12 made of a magnetic material. Sleeve 12 is constructed cylindrically and is pressed onto nonmagnetic separating element 10. Sleeve 12 has a first end 31, which is formed cylindrically like a center region of sleeve 12, and is located in contact with housing part 16. Second end 32 is developed as a cylindrical constriction, so that the sleeve has a shoulder 33, the second end 32 being in contact with internal pole 7. In this instance, shoulder 33 lies against end face 10a of nonmagnetic separating element 10. Consequently, this exemplary embodiment also has a form-locking and a force-locking connection between nonmagnetic separating element 10 and magnetic choke device 13 that is developed as a sleeve. Thereby, according to the present invention, because of a cost-effectively producible and rapidly and simply mountable sleeve 12, a solenoid valve having superb opening and closing times may also be provided.

With regard to the exemplary embodiment of FIGS. 3 and 4, it should be remarked that, instead of a cylindrical sleeve 12, a polygonal sleeve, such as an octagonal or decagonal sleeve may also be used.

What is claimed is:

1. A solenoid valve for controlling fluids, comprising:
   a closing element which selectively opens and closes at least one outlet opening at a valve seat;
   a magnetic circuit having an armature, an internal pole and a magnetic return path; and
   a coil;
   wherein:
   the armature cooperates with the closing element;
   the magnetic circuit further includes (i) a nonmagnetic separating element for interrupting the magnetic circuit and (ii) a magnetic choke device situated to provide a magnetic bridge across the nonmagnetic separating element and selectively closing the magnetic circuit at the nonmagnetic separating element; and
   the magnetic choke device is a separate individual component which is fixed using at least one of a form-locking and a force-locking connection,
   wherein the magnetic choke device is situated radially outside the nonmagnetic separating element, the magnetic choke device includes a plurality of strip-shaped elements made of magnetic material, and at least one strip-shaped element of the plurality of strip-shaped elements has a first reshaping at a first end which is in contact with the magnetic return path situated below the nonmagnetic separating element, and a second reshaping at a second end which is in contact with the internal pole situated above the nonmagnetic separating element.

2. The solenoid valve as recited in claim 1, wherein the magnetic choke device is a magnetic sleeve.

3. The solenoid valve as recited in claim 2, wherein the magnetic sleeve has one of a cylindrical cross section or a polygonal cross section.

4. The solenoid valve as recited in claim 1, wherein the magnetic choke device includes a plurality of strip-shaped elements made of magnetic material.

5. The solenoid valve as recited in claim 1, wherein a first end of the magnetic choke device is in contact with the magnetic return path situated below the nonmagnetic separating element and a second end of the magnetic choke device is in contact with the internal pole situated above the nonmagnetic separating element.

6. The solenoid valve as recited in claim 1, wherein a cross sectional area of the nonmagnetic separating element is greater than a cross sectional area of the magnetic choke device.

7. The solenoid valve as recited in claim 1, wherein the magnetic choke device is situated directly on an outer surface of the nonmagnetic separating element.

* * * * *